(12) United States Patent
Rezgui et al.

(10) Patent No.: US 7,562,580 B2
(45) Date of Patent: Jul. 21, 2009

(54) RUGGEDIZED PRESSURE SENSOR

(75) Inventors: Fadhel Rezgui, Chatillon (FR);
Songming Huang, Hardwick (GB)

(73) Assignee: Schlumberger Technology Corporation, Cambridge, MA (US)

( * ) Notice: Subject to any disclaimer, the term of this patent is extended or adjusted under 35 U.S.C. 154(b) by 14 days.

(21) Appl. No.: 11/839,397

(22) Filed: Aug. 15, 2007

(65) Prior Publication Data

US 2008/0066555 A1  Mar. 20, 2008

(30) Foreign Application Priority Data

Sep. 15, 2006  (GB) ................ 0618161.4

(51) Int. Cl.
*G01L 13/02*  (2006.01)
*G01L 15/00*  (2006.01)

(52) U.S. Cl. .................. 73/716; 73/715; 73/753; 73/756

(58) Field of Classification Search ........... 73/700–756; 361/283.1–283.4
See application file for complete search history.

(56) References Cited

U.S. PATENT DOCUMENTS

| 5,019,783 | A | | 5/1991 | Cadwell |
| 5,186,054 | A | | 2/1993 | Sekimura |
| 5,315,878 | A | * | 5/1994 | Birenheide .................... 73/727 |
| 5,533,404 | A | * | 7/1996 | Wurst et al. .................... 73/756 |
| 5,605,360 | A | * | 2/1997 | Kurisaki et al. ............... 285/93 |
| 6,112,598 | A | * | 9/2000 | Tenerz et al. .................. 73/756 |
| 6,151,967 | A | | 11/2000 | McIntosh et al. |
| 6,655,216 | B1 | * | 12/2003 | Aizawa ....................... 73/715 |
| 6,854,851 | B2 | * | 2/2005 | Yamasaki et al. ............. 353/97 |

FOREIGN PATENT DOCUMENTS

| DE | 29 40 955 A1 | | 4/1981 |
| JP | 58103636 A | * | 6/1983 |
| JP | 3-63538 A | | 3/1991 |
| JP | 09015184 A | * | 1/1997 |
| JP | 2000-249612 A | | 9/2000 |
| WO | WO 91/17418 A1 | | 11/1991 |

\* cited by examiner

*Primary Examiner*—Andre J Allen
*Assistant Examiner*—Jermaine Jenkins
(74) *Attorney, Agent, or Firm*—James McAleenan; Michael Ford; Steven Gahlings

(57) ABSTRACT

A ruggedized pressure sensor is described for high pressure applications having a top part of hard material with a surface adapted to deform when exposed to pressure, transducers to transform deformation of the surface into a signal proportional to the pressure, and a base part of hard material, wherein the base part has one or more openings.

20 Claims, 4 Drawing Sheets

RUGGEDIZED PRESSURE SENSOR

The present invention relates to pressure sensors designed to withstand extreme environmental conditions, such as exposure to pressurized liquids as for example encountered in boreholes penetrating subterranean reservoirs.

CROSS-REFERENCE TO RELATED APPLICATIONS

This application claims the benefits of priority from Application Number 0618161.4, entitled "RUGGEDIZED PRESSURE SENSOR," filed in the United Kingdom on Sep. 15, 2006, which is commonly assigned to assignee of the present invention and hereby incorporated by reference in its entirety.

BACKGROUND OF THE INVENTION

There are many oil field applications which require downhole pressure and differential pressure measurements. For applications such as permanent monitoring of completion systems and logging/measurement in producing zones, where the deployment of the sensor may be done via a ¼" hydraulic control line, reliable and compact sensors which occupy minimum space are much desired.

There are also many applications where a differential pressure measurement is required. Typical examples include the determination of flow rate through flow control valves, down hole pump monitoring, Venturi based flow meters and density measurement based on manometer principle. In these applications, the measurement range varies from a few psi to a few thousand psi and for some applications accuracies better than +/−0.5 psi are required.

For permanent placement in a high pressure (above 1000 psi or 3000 psi or more) and possibly high temperature (above 70 or 90, or sometime even above 100 degrees Celsius) environment, it is important to provide sensors with a high reliability, measuring stability and a long lifetime. To date, there is no suitable differential pressure sensor available for such applications, at least in the field of monitoring of hydrocarbon reservoirs. Typically, two absolute pressure sensors are applied for such differential measurement. This approach has limited accuracy and increases the costs.

Silicon-based differential pressure sensors have been used in downhole production logging (PL) tools. These sensors, having their maximum measurement range limited to just a few psi, are unsuitable for high range applications such as monitoring the downhole flow valves and downhole pumps. As the demand for permanent downhole differential pressure measurement increases, so does the demand for a high quality and high range downhole differential pressure sensor.

Schlumberger has developed an absolute pressure sensor based on sapphire material. This is a very high performance sensor which has achieved an impressive track record during field applications. Typical performance data include excellent stability of 1 psi/year over a 10000 psi measurement range of 10000 psi, a resolution of 0.05 psi and accuracy to 0.01% of the full scale.

There are some disadvantages associated with the known sensor. For example in its usual configuration it cannot be used to measure differential pressure. And as the pressure to be measured is applied to the side where the electrical connections to the strain gauges are made, isolation is required between the actual sensor and the pressurized borehole fluid. This limits the possible reduction of the sensor package size.

It is therefore an object of the present invention to improve and enhance the capabilities of existing ruggedized pressure sensors.

SUMMARY OF THE INVENTION

The invention includes as a first aspect a ruggedized pressure sensor for high pressure applications comprising a top part of hard material with a surface adapted to deform when exposed to pressure, transducers to transform deformation of said surface into a signal proportional to said pressure, and a base part of hard material, wherein the base part has one or more openings. The top part and the base part together enclose a small volume referred to herein as a cell.

The cell should be sufficiently stable to allow the sensor to measure pressures of preferably more than 1000 psi, or more than 3000 psi or even more than 10 kpsi.

In a second aspect the base plate extends into a tubular decoupling element to separate the base plate from a mounting surface. It is preferred to arrange for the decoupling element to have a smaller outer diameter that the base plate such that the decoupler has a higher compliancy against strains. In a particular preferred embodiment the arrangement of base plate and decoupling tube is mushroom-shaped.

In another preferred embodiment the hard material has a Moh's hardness of at least 8, even more preferably it is made of gemstone material of this hardness, for example diamond, zirconia, ruby, or emerald, spinel or topaz. When cutting the parts of the sensor from a monolithic gemstone care should be taken to preserve the respective orientation of the top part, the bottom part and decoupling element in the gemstone within the assembled sensor so that no further anisotropies are created during assembly of the hard sensor parts.

The opening in the base part can be used to pressurize the interior of the cell such that the cell can be operated as a pressure sensor with the pressurized side being the interior of the cell. Having two different variable pressures at the interior and exterior side, respectively, makes the membrane at the top of the cell responsive to the differential pressure of the two pressures. Alternatively, the opening can be used to guide probes, sensors, wires and the like into the interior of the cell.

This invention describes a new sensing structure which overcomes limitations of known device. The structure enables the measurement of differential pressure, the design of very compact absolute pressure sensor and the integration of P (absolute), ΔP and T (temperature) measurements in a single package. It also minimizes the effects of environmental variables, such as line pressure and temperature.

By using a very hard material such as sapphire as structure material, a high measurement range, excellent resolution, high reliability, low drift as well as a compact sensor size can be achieved. These include up to ±5000 psi range and better than 0.05 psi resolution for differential pressure measurement, and a range up to 20000 psi for absolute pressure measurement.

Devices in accordance with the present invention has the potential to satisfy most demanding downhole applications which require high dynamic range of measurement, good long term stability, long operating life, etc. Typical examples include monitoring flow through valves, inside pumps and pressure measurement behind packers in a well. This sensor also has the potential for low-range but high-sensitivity applications such as the Venturi-type flow meters.

BRIEF DESCRIPTION OF THE DRAWINGS

The present invention will become more fully understood from the detailed description and the accompanying drawings, wherein.

DETAILED DESCRIPTION

In the following description, for the purposes of explanation, the background technologies, a basic example this invention and various preferred embodiments of the basic example are set forth in order to provide a thorough understanding of the invention. However, it will be apparent that the invention may be practiced without these specific details.

Figure 1:
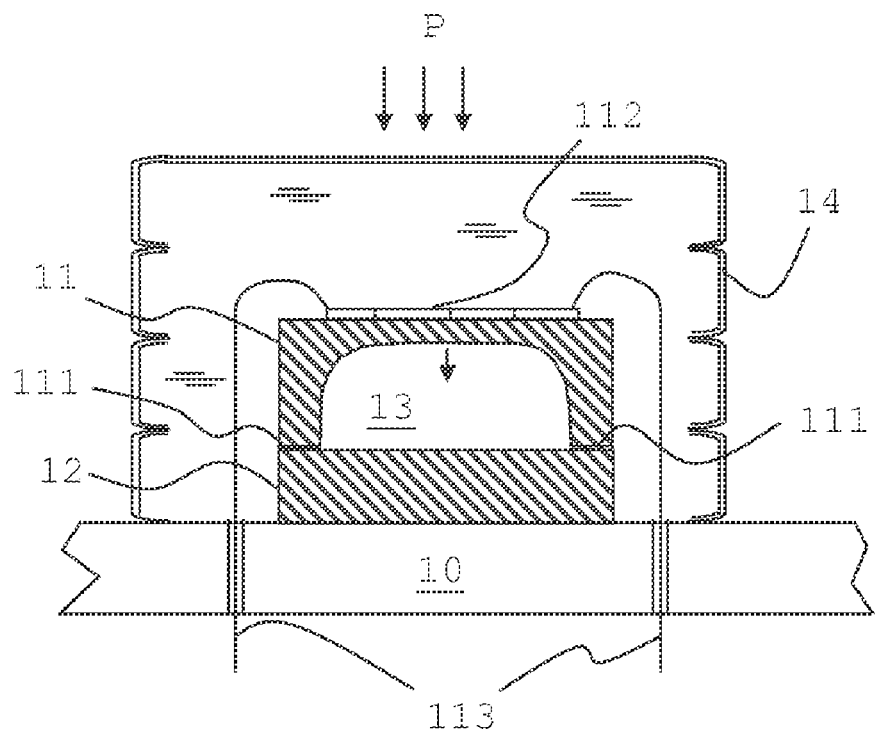
FIG. 1 is a schematic drawing of a known pressure sensor.

A known variant of an absolute pressure sensor as developed by Schlumberger is shown in FIG. 1. In several versions such sensors are designed to cover ranges of 0 to 10000 psi and 0 to 20000 psi. The basic sensing cell of this sensor consists of a half capsule or cap 11 made of sapphire and a circular base plate 12 made of the same material. The two parts are joined by a glass sealing 111. A vacuum is created at the internal space 13 between the two parts 11, 12. The vacuum serves as a constant absolute pressure reference of effectively zero pressure. The sapphire base plate 12 is assembled to the metal body 10 of the sensor package.

On the top face of the half capsule 11, there are deposited several strain gauges 112, which generate a signal representative of the deformation of the top section of the half capsule 11 and in turn represent the amount of pressure P causing the deformation. To insulate the strain gauges 112 and the electrical feed-throughs 113 from the environment, which for example may contain conductive borehole liquids, the pressure sensor is enclosed in a liquid-filled bellow-type housing 14. The housing 14 though sufficiently compliant to be transparent to the outside pressure P is designed to prevent any direct exposure of the capsule 11 and the electrical connectors 113 to the pressurized medium outside the bellow 14. The filling liquid is usually inert and non-conductive such as silicone oil.

When a pressure is applied externally to the sensing half capsule 11, the thin top section of the sapphire capsule, also herein referred to as membrane, deforms with its central area being pushed in the same direction as that of the applied pressure P (indicated by arrows). Such deformation is measured by the resistive strain gauges 112 deposited on the membrane using thin-film technology. The gauge's resistance change caused by pressure induced strain on the membrane is converted into a voltage signal via a resistivity measurement such as a Wheatstone bridge (not shown).

It should be noted that to measure a differential pressure, two pressure sensors of the type illustrated in FIG. 1 are required. This causes problems with respect to the mutual locations of the sensors, their calibration and other differences which make it difficult to precisely match the measurements.

To avoid such problems, the invention provides an improvement of the known sensors. Some elements of the present invention are illustrated in FIG. 2.

Figure 2A:
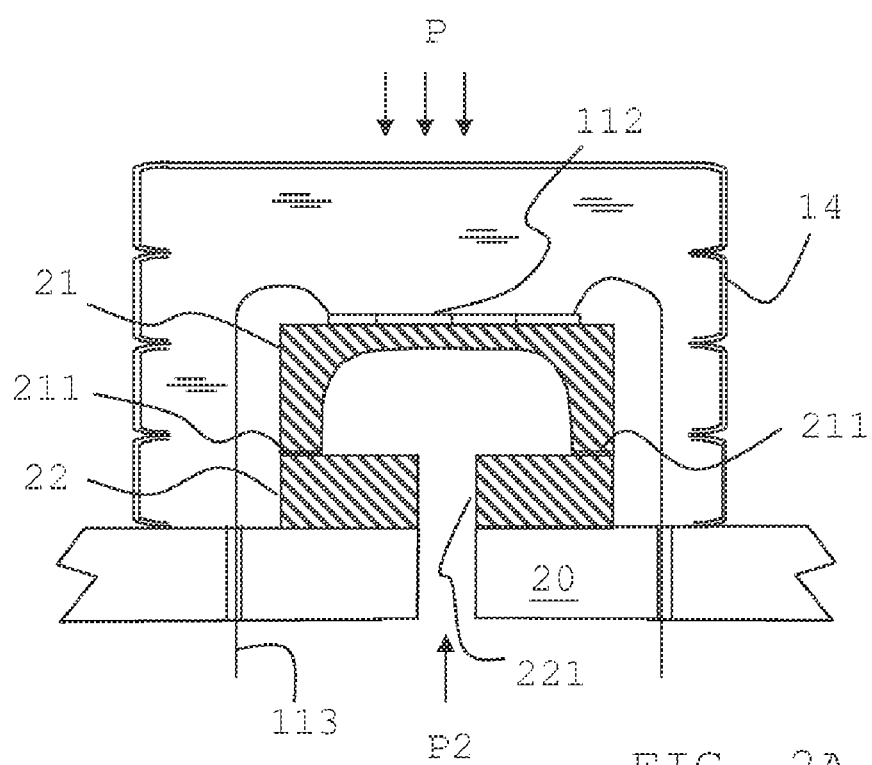
FIGS. 2A,B illustrate elements of pressure sensors in accordance with examples of the invention.

In FIG. 2A, there is shown a sensor including a half capsule 21 made of sapphire and a circular base plate 22 made of the same material as in the known pressure sensor. Again the two parts are best joined by a glass sealing 211 though this can be replaced by other suitable joints such as metal brazing and the like, provided that such seal can withstand the pressures for which such a ruggedized sensor is designed.

However instead of providing a sealed vacuum in the half capsule 21, it is an element of the present invention to provide one or more channels 221 which penetrate the base 22. The channels 221 can be used for various purposes such as introducing a variable pressure P2 to the inner face of the capsule 21, or providing access for transducers or wiring to the inner face. Other parts of the device as far as already shown in FIG. 1 are shown in this figure using the same numerals.

Surprisingly it was found that the new capsule can withstand pressure which exerts tensile force on the capsule 21 and the sealing 211 even at high pressures differentials and in extreme temperature environments, even though the hole 221 in the base plate 22 could have lead to a significant weakening of the sensor's mechanical stability.

Figure 2B:
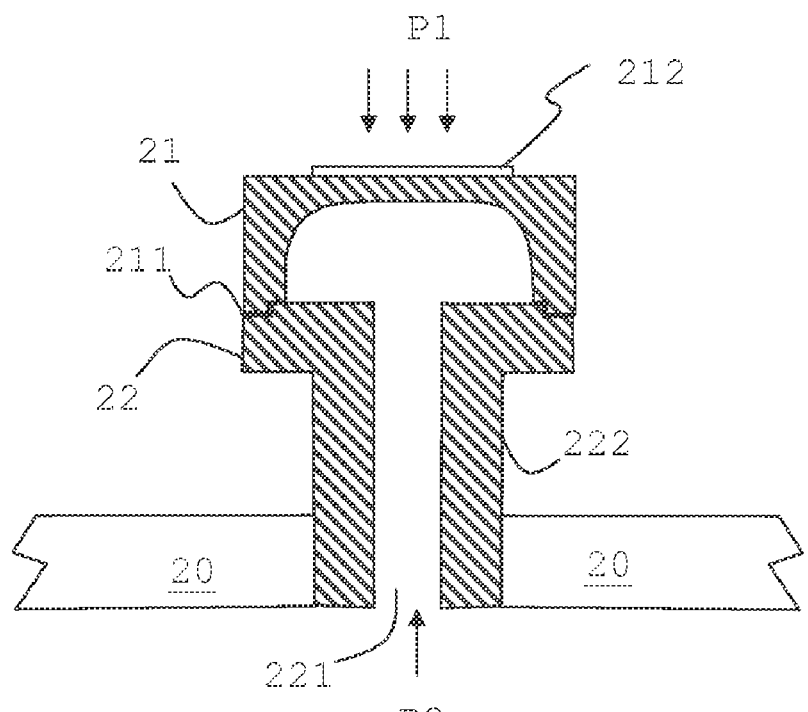

In FIG. 2B there is shown a further improved variant of the invention. In this variant the base plate 22 is mounted onto a strain decoupling element 222. The decoupling element is made of the same sapphire material as the capsule 21 and the base plate 22. It separates the metal housing 20 from the sensor 21. In the example shown the decoupling element 222 has an outer diameter of 5 mm. This outer diameter is smaller than the diameter of the base plate 22. Depending on the application, the total length of the decoupling element 222 exceeds the thickness of the base plate 22 by at least a factor of 2. A more effective decoupling can be achieved by increasing the length to at least 3 times the thickness of the base plate.

In the example shown the base plate 22 and the decoupling element 222 are actually one monolithic piece of sapphire, onto which the capsule 21 is glass bonded using a glass seal 211. To increase the resistance against failure on tensile strain, a step has been milled between the capsule 21 and the base in the region of the seal 211 such that a bond between the capsule 21 and the base plate 22 exist between both vertically and horizontally oriented surfaces of both parts.

At the distal end the decoupling tube 222 is assembled to the packaging/housing 20 of the device using metal brazing using an intermediate metallization step to increase the bonding strength at this joint.

It is an important function of the decoupling tube 222 to isolate the sensing element from the overall sensor package, so that stresses in the packaging body (normally metal) caused by pressure and temperature will have little effect on the sensing element. The stresses will be absorbed by the body of the tube 222 and will not be transferred to the base 22 and the capsule 21. For this reason, the tube is referred to as decoupling element.

Numerical simulation show that the sensor zero shift due to a line pressure change from 0 to 20000 psi is less than 2 psi, and maximum sensitivity change is around 4% from a normal value of 24 μV/psi. The zero drift for a temperature change from 0 to 150° C. is about 6 psi (before compensation).

Preferably all three parts of the sensor are milled or machined from the same crystal and more preferably mounted such as to preserve the original orientation of the parts. This way of orienting the parts avoids that the anisotropy of the crystalline material is oriented differently in different parts. Effectively, the sensor capsule 21, the base plate 22 and the decoupler 222 are manufactured and assembled such that all three parts are as close as possible to resemble a monolithic device made from a single piece of sapphire.

As shown the device can be described as a 'mushroom' like structure with a sensing element in the form of a half capsule 21 with a thin membrane, and a 'T' shaped base plate 22 with a decoupling guide tube 222, both made of the same material.

Sapphire is chosen as the preferred material for the sensing capsule and the decoupling tube because it has a rare combination of excellent mechanical, thermal, electrical and chemical properties. Mechanically, sapphire has high strength, very low hysteresis and a very linear elastic region over a large stress range, which is ideal for use as pressure sensing membrane. It is also micro-machinable, allowing to be made into desired shapes. It has very low thermal expansion (and hence low temperature sensitivity) and high thermal diffusivity to reach thermal equilibrium quickly. It is a very good electrical insulator which is required for strain gauge based measurements. Sapphire has high resistance to chemical attack and to sand erosion when directly exposed to well bore fluids.

As described above, when assembling the two sapphire parts together to form the mushroom structure, the anisotropy of the capsule and that of the tube are aligned to the same direction, so that stresses generated by mismatch of physical properties (e.g. thermal expansion coefficient) of the two parts are minimized.

Other natural or synthetic gemstone materials can be used to at least partially match the above advantages of sapphire. These materials include for example diamond, zirconia, ruby, or emerald, spinel or topaz. As far as hardness is concerned, suitable material has a Moh's hardness of 8 to 10.

Possible applications of pressures sensors in accordance with examples of the invention are described in the following.

When the sensor is for example used as differential pressure sensor, the channel 221 serves to introduce the second pressure, P2, via the decoupling guide tube 222, into the inner space of the sensor cell, i.e., the cavity between the capsule 21 and the base plate 22. Thus the pressure sensing membrane of the capsule 21 deforms according to the difference between the external and the internal pressure, i.e. the central area deflects inward if the external pressure, P1, is larger than the internal pressure, P2, or outward vice versa.

As a preferred implementation, the differential pressure value is determined through strain measurement using resistive gauges 212 deposited on the external surface of the membrane (e.g. by thin film technology). The membrane thickness and the internal shape of the sapphire capsule are optimized according to the required differential pressure measurement range, burst pressure rating and symmetry requirement for response to positive and negative pressure differences. For example a thickness 200 micron is considered to be sufficient for pressures of up to 3000 psi. A thickness of 400 mm covers most application up to 10 kpsi or even 20 Kpsi. The internal cutting of the top membrane inside the capsule can be performed using a small transition radius, between the cylindrical bore and the flat membrane, for example r1=0.5 mm at the edge of the membrane and a much larger diameter, for example r2=100 mm for the central flat region. Thus the top membrane of the capsule 22 is very flat which facilitates the differential pressure measurement.

The overall packaging of a differential pressure sensor provides the passages of the two pressures to the external and internal of the Sapphire sensing cell, as well as the isolation between the two passages. The packaging also isolates the pressure ports from the measurement transducers as well as associated electrical or optical connections.

For different applications the basic design of the sensor can be altered. Some examples are shown in FIGS. 3A-D. Only differentiating elements are highlighted by the drawings whilst other elements already described above are omitted for the sake of greater clarity.

Figure 3A:
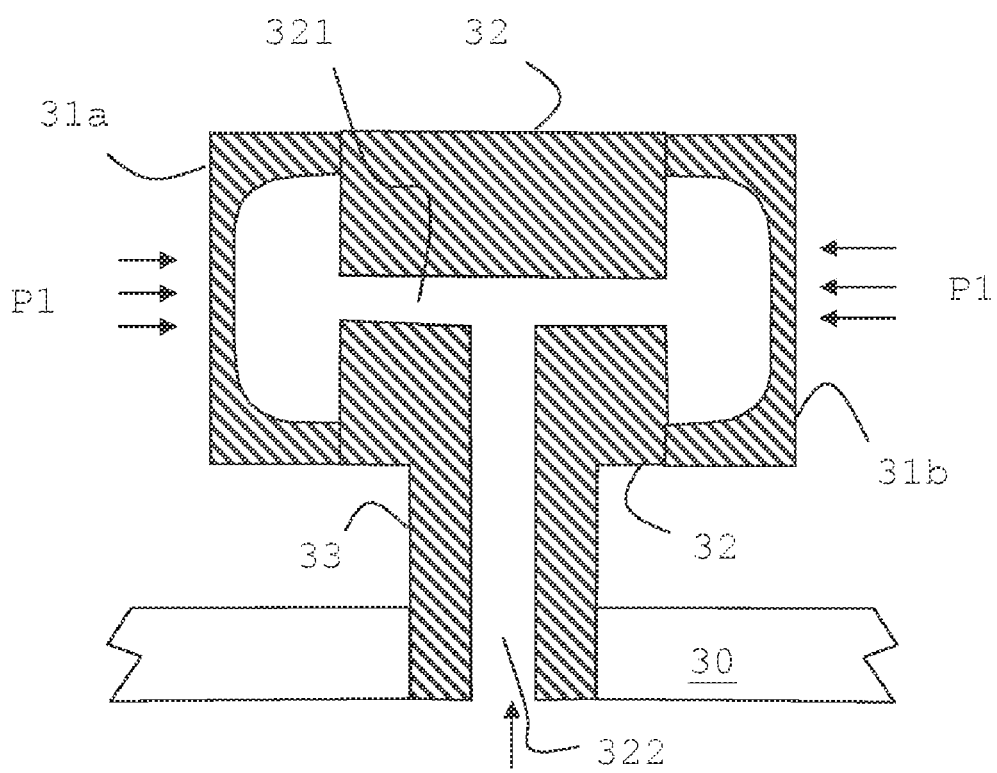
FIGS. 3A-3D illustrate further variants and applications of sensors in accordance with the present invention.

In FIG. 3A, the sensing element consists of two Sapphire capsules 31a,b which are back to back assembled to a Sapphire base plate 32, thus forming the sensing cells. The plate 32 has a central bore 321 and a second bore 322 from one side to the center, in order to provide a passage for introducing pressure P2 to the internal spaces of the two sensing cells. A sapphire tube 33 links the dual-cell assembly to the packaging body 30. The tube 33 acts as a decoupler between the sensing elements 31a,b and the housing 30. The strain gauges, their respective pick-up circuits and protective bellows are similar to those shown in the example of FIG. 1 and are therefore not shown in detail. This variant of the invention achieves double sensitivity by adding the outputs of two Wheatstone bridges, one on each capsule, together while maintaining the same membrane thickness and burst pressure rating.

Figure 3B:
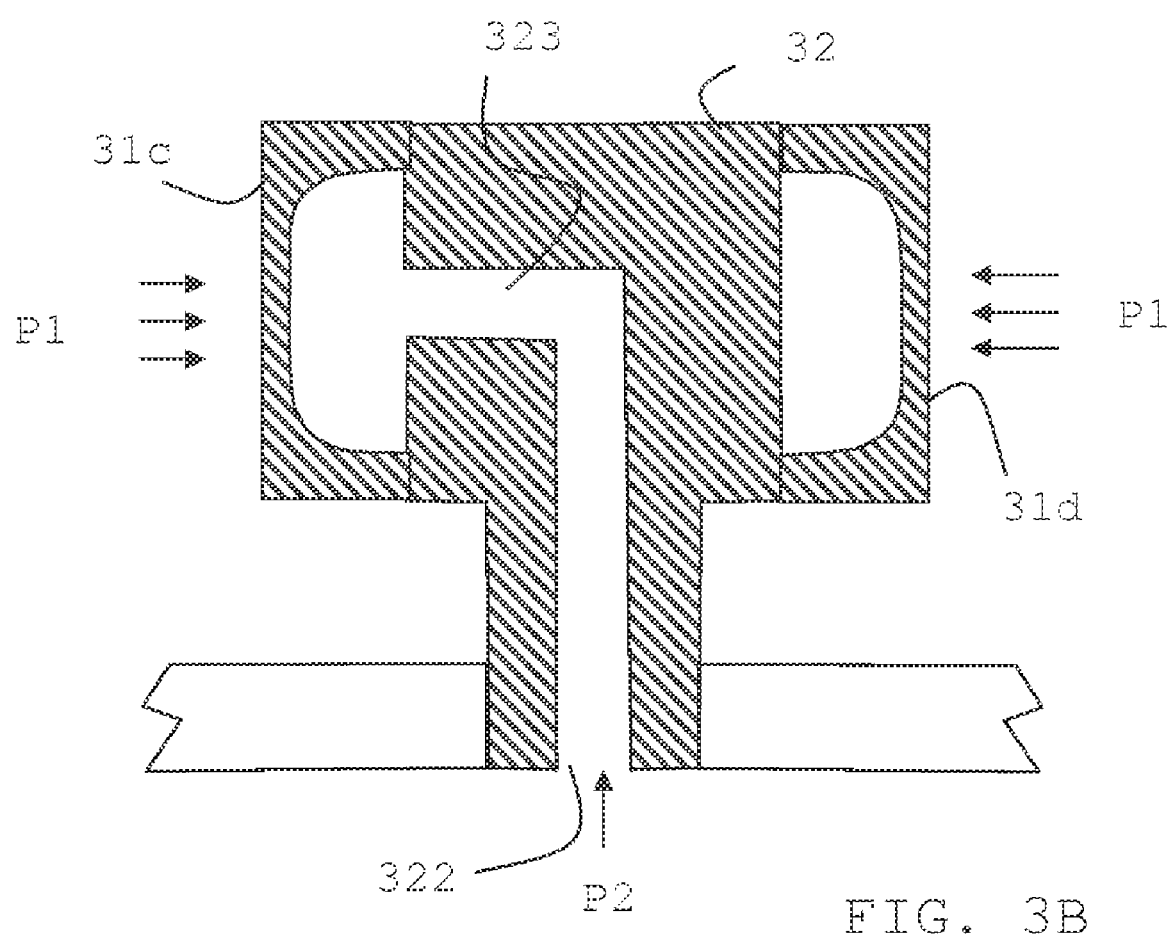

FIG. 3B shows a similar structure which combines a differential pressure cell 31c with an absolute pressure cell 31d. In this case the hole 323 in the center of the base plate 32 is drilled half way through to guide pressure P2 into only one of the cells 31c, whereas vacuum is maintained behind the membrane of the other cell 31d. Such integration allows a measurement differential pressure and an absolute pressure from one sensor package.

Using the temperature dependence of deposited material on the pressure sensor, it is possible to add a temperature measurement to the package without further increasing its size. These three measurements are of significance in any type of flow measurements where the flow is measured though a pressure drop with a flow constriction, e.g., Venturi-type flowmeters as often encountered in the hydrocarbon production monitoring.

Figure 3C:
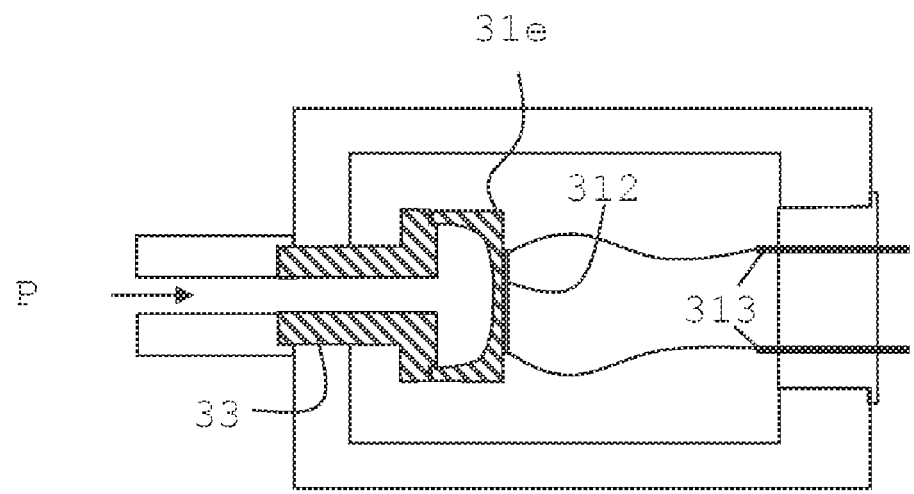

The invention can also be used to improve the performance and applicability of the sensor as absolute pressure sensor. For example FIG. 3C shows an absolute pressure sensor. In contrast to the known device however, the well bore fluid at pressure P is introduced into the internal space of the sensor cell 31e through the decoupling guide tube 33 with the strain gauges 312 and their electrical connections 313 on the constant or reference pressure side. Compared to the known absolute pressure sensor of FIG. 1, which requires bellows filled with clean liquid to protect the electrical connections, this configuration eliminates the need for such protective components because the well bore fluid will be only in contact with sapphire material, which has high corrosion resistance. As a result, the package of such a bellows-free device can be made much smaller.

Figure 3D:
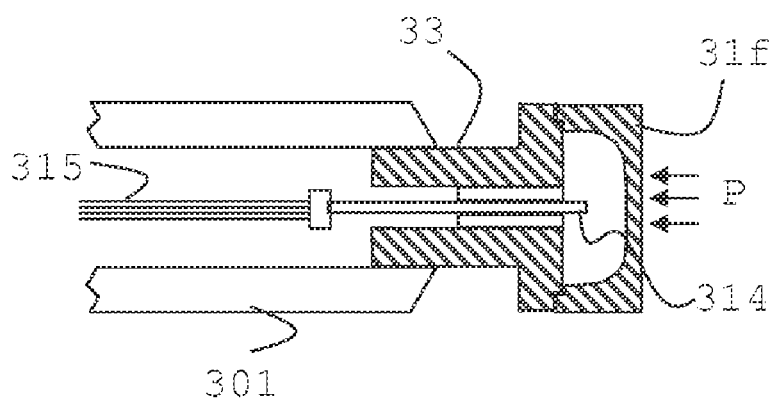

Another variation of an improved absolute pressure sensor is shown in FIG. 3D, where the absolute pressure is applied externally to the sensing cell 31f but the strain gauges usually applied to the outside of the pressure cell are removed. The pressure measurement is done by measuring the displacement of the top part or membrane of the cell 31f by using an internal displacement sensor or transducer 314 which can be based on optical methods as shown, or capacitance or acoustic methods.

The internal of the sensor cell is kept as vacuum or at another reference pressure and the external of the cell 31f can be directly exposed to the environment without additional packaging. The end of the decoupling tube 33 is assembled to the packaging shell tube 301 that protects the signal cables 315. The total outer diameter of the sensor can be made reduced to less 10 mm or even less than 5 mm. Such a sensor on the tip of for example a cable can be used for deployment and logging through a thin guide tube such as hydraulic control lines.

Figure 4:
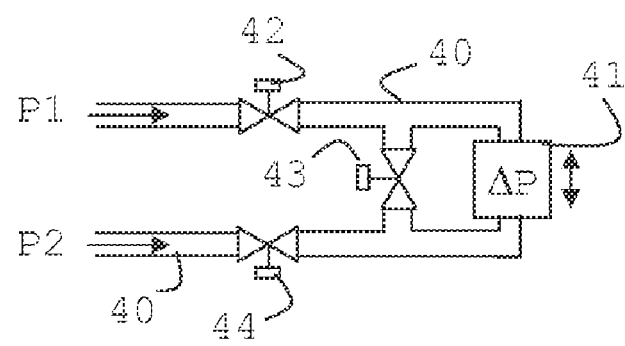
FIG. 4 illustrates a protective hydraulic circuit including a pressure sensor in accordance with another aspect of the present invention.

Important issues associated with down-hole differential pressure sensors include over range protection or pressure shock protection. In FIG. 4 there is shown a pressure sensor 41 in accordance with an example of the present invention embedded into a network of pipes 40 with a three-valve configuration. The valves 42, 43, 44 protect the sensor from excessive pressure load by using for example valve 43 to short-circuit the pressurized fluids before an excessive pressure can built up at the sensor 41.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims. Although specific embodiments of the invention have been described, various modifications, alterations, alternative constructions, and equivalents are also encompassed within the scope of the invention.

The invention claimed is:

1. A ruggedized pressure sensor for high pressure applications comprising a top part and a base part, both of hard material with a Moh's hardness of at least 8 enclosing a volume covered by a surface of the top part adapted to deform when exposed to pressure, said sensor further comprising transducers to transform deformation of said surface into a signal proportional to said pressure, and a tubular decoupling element connected to the base part to separate the base part from a mounting surface, wherein the base part has one or more openings therethrough and the passage through the decoupling element communicates with said volume through said one or more openings.

2. The sensor of claim 1 wherein the top part, the bottom part and the decoupling element are made from gemstone material.

3. The sensor of claim 2 wherein the top part, the bottom part and the decoupling element are cut from a monolithic gemstone and preserving a respective orientation of the top part, the bottom part and the decoupling element in the gemstone within the assembled sensor.

4. The pressure sensor of claim 2 wherein the gemstone material is sapphire.

5. The sensor of claim 1 wherein a cross-section of the combined base part and the decoupling element perpendicular to the central line though decoupling element has a T-shape.

6. The sensor of claim 1 adapted to receive a variable pressure through said decoupling element and said one or more openings through the base part.

7. The sensor of claim 1 adapted to receive variable pressures from both sides of the deforming surface with one variable pressure passing through said decoupling element and said one or more openings through the base part.

8. The sensor of claim 1 having the transducer or connecting elements of said transducer guided through said decoupling element and said one or more openings through the base part.

9. The pressure sensor of claim 1 located at an end of a tubular structure thus forming a local pressure probe.

10. The pressure sensor of claim 9, wherein the maximum diameter of the local pressure probe at the near end of the tubular structure is 10 mm or less.

11. The pressure sensor of claim 9, wherein the tubular structure is a flexible cable.

12. The pressure sensor of claim 1 embedded in a network of pressure vessels and valves adapted to protect the sensor from over pressure.

13. The pressure sensor of claim 1 designed to operate above 1000 psi.

14. The pressure sensor of claim 1 designed to operate above 3000 psi.

15. The pressure sensor of claim 1 designed to operate above 10000 psi.

16. The pressure sensor of claim 1 wherein the top part and bottom part are connected together by a glass sealing.

17. The pressure sensor of claim 1 wherein said passage through the decoupling element and said one or more openings through said base part are smaller in cross section than said volume enclosed by said top and base parts.

18. A ruggedized pressure sensing device for high pressure applications which comprises two sensors, each comprising a top part and a base part, both of hard material with a Moh's hardness of at least 8, the top and base parts of each sensor enclosing a volume covered by a surface of the top part adapted to deform when exposed to pressure, and also comprising transducers to transform deformation of said surface into a signal proportional to said pressure, the sensing device further comprising a tubular decoupling element connected to both base parts to separate the base parts from a mounting surface, wherein each base part has one or more openings therethrough and the passage through the decoupling element communicates an equal variable pressure to the enclosed volumes of both sensors through said one or more openings.

19. The sensor of claim 18 adapted to receive variable pressures from both sides of the deforming surfaces of the top parts with one variable pressure passing through said decoupling element and said one or more openings through the base parts.

20. A ruggedized pressure sensing device for high pressure applications which comprises two sensors, each comprising a top part and a base part, both of hard material with a Moh's hardness of at least 8, the top and base parts of each sensor enclosing a volume covered by a surface of the top part adapted to deform when exposed to pressure, and also comprising transducers to transform deformation of said surface into a signal proportional to said pressure, the sensing device further comprising a tubular decoupling element connected to both base parts to separate the base parts from a mounting surface, wherein the base part of only one sensor has one or more openings therethrough and the passage through the decoupling element communicates a variable pressure to the enclosed volume of said one sensor through said one or more openings, for said one sensor to measure a differential pressure while the other sensor measures an absolute pressure.

* * * * *